United States Patent [19]

Kiyoshi

[11] Patent Number: 5,128,917
[45] Date of Patent: Jul. 7, 1992

[54] TRACKING DEVICE FOR OPTICAL MEMORY CARD

[75] Inventor: Horie Kiyoshi, Kanagawa, Japan
[73] Assignee: Kabushiki Kaisha CSK, Tokyo, Japan
[21] Appl. No.: 415,300
[22] PCT Filed: Dec. 28, 1988
[86] PCT No.: PCT/JP88/01346
    § 371 Date: Oct. 13, 1989
    § 102(e) Date: Oct. 13, 1989
[87] PCT Pub. No.: WO89/06423
    PCT Pub. Date: Jul. 13, 1989

[30] Foreign Application Priority Data

Dec. 28, 1987 [JP] Japan .................. 62-334122

[51] Int. Cl.⁵ .................................... G11B 7/09
[52] U.S. Cl. ........................ 369/44.320; 369/44.34;
        369/44.35; 369/54; 235/454; 235/476
[58] Field of Search .............. 369/44.25, 44.29, 44.32,
        369/44.34, 44.35, 54, 58; 235/454, 456, 475, 476

[56] References Cited

U.S. PATENT DOCUMENTS 4,787,076  11/1988  Deguchi et al. ............ 369/44.34
4,821,251   4/1989  Hosoya ....................... 369/54 X
4,879,707  11/1989  Getreuer et al. ........... 369/44.29 X

FOREIGN PATENT DOCUMENTS 60-182523  9/1985  Japan.

Primary Examiner—Roy N. Envall, Jr.
Assistant Examiner—W. R. Young

[57] ABSTRACT

Tracking device for an optical memory card includes an inclination information sampling unit for calculating changes per unit time of the low-frequency component of a tracking error signal, a detection unit for outputting a detection signal for duration of a deviation occurring during tracking that exceeds a predetermined standard range, a cumulative addition unit for cumulatively adding the output of the inclination information sampling unit of the low-frequency component of the tracking error signal that is generated when the detection signal is generated at each unit time during the generation of the detection signal, and a switch-over unit for outputting as an optical system tracking control signal the tracking error signal during the normal operation and the output of the cumulative addition unit during the outputting of the detection signal.

5 Claims, 4 Drawing Sheets

TRACKING DEVICE FOR OPTICAL MEMORY CARD

DESCRIPTION

1. Technical Field

The present invention relates to an optical memory card, and more particularly, to a tracking device for an optical memory card.

2. Background Art

Optical recording media on which digital data is recorded by forming optically changed patterns such as bright and dark pits have recently been attracting considerable attention. Since data can be recorded on such optical recording media at a high density, optical recording media offer the ability to provide large capacity memories. Proposals have therefore been made not only for disk type optical memories but also for card type memories.

In an optical memory card of the above described type, optically or magneto-optically changed states are formed in a discrete fashion on the surface of the card in correspondence to the data to be recorded, such changed states being read by irradiating an optical beam such as laser beam thereon.

In practice, fine irregularities or a bright and dark pattern may be formed on the surface of the recording medium, i.e., on the surface of the card, and the recorded data is read by utilizing the difference in the reflectivity, the index of refraction or the transmittance of the optical beam irradiated on the fine irregularities or the bright and dark pattern. Alternatively, the thermomagnetically recorded data is read from the recording medium by utilizing variations in polarization caused owing to the magnetooptic effect of the optical beam irradiated on the recording medium.

As shown in FIG. 6, data is generally written on a card 81 on data tracks 82 formed adjacent to and along tracking lines 80 provided in the longitudinal direction of the card 81. Data thus recorded is generally read from or written on any arbitrary data track 82 first by moving a reading or writing optical system in the transverse direction of the tracks and selecting a target data track and then by moving the card 81 in the direction of the tracks and running a reading or writing beam relative to the card 81 along that data track 82 while making the optical system follow the tracking line corresponding to the target data track.

When the optical system follows tracking lines, an optical image 8 of the associated tracking line is received by light-receiving elements 7a and 7b, and an amplifier 9 outputs a signal representing the difference occurring in the outputs of these elements as a tracking error signal, as shown in FIG. 4. The tracking error signal is a signal proportional to any deviation occurring during the tracking. Deviation occurring during the tracking is corrected by moving a mobile objective lens of the optical system in the transverse direction of the track in correspondence to this tracking error signal. The mobile objective lens is held on a lens retaining portion provided in the optical system by spring members such as hair springs in such a manner as to be movable in the vertical and horizontal directions. Electromagnetic force is utilized to move the mobile objective lens. Vertical movement of the objective lens is utilized for focusing control, whereas horizontal movement thereof is utilized for the tracking control.

However, in the above-described optical memory card, there is a possibility that a normal tracking error signal cannot be obtained due to dust or scratches existing on the optical memory card and thus that a tracking servo circuit cannot be operated normally. This makes normal tracking control and, hence, normal writing of data on and reading of data from the optical memory card impossible.

Accordingly, one countermeasure that has been considered is to store a tracking error signal that is obtained immediately before detection of dust or a scratch and to substitute this stored signal for a tracking error signal when the dust or scratch is detected. However, in a card-type optical memory, the existence of a certain degree of skew of the tracking lines relative to an optical system is unavoidable in terms of the accuracy with which the tracking lines are in practice made parallel to the sides of the card or in terms of the accuracy of a card supporting/moving mechanism. It is therefore insufficient if one is to cope with an error caused by this skew to employ a signal obtained by holding a tracking error signal. This makes normal tracking control impossible.

DISCLOSURE OF INVENTION

An object of the present invention is to provide a tracking device for an optical memory card which is capable of coping with any dust or scratch existing on the card even when there is a certain degree of skew of the card.

To this end, the present invention provides a tracking device for an optical memory card in which tracking correction is performed in accordance with any tracking error made by an optical system relative to the optical memory card, as shown in FIG. 1. The tracking device comprises inclination information sampling means for calculating changes per unit time of the low-frequency component of a tracking error signal, detection means for outputting a detection signal for the duration of any deviation occurring during tracking that exceeds a predetermined standard range, cumulative addition means for cumulatively adding the output of the inclination information sampling means to the low-frequency component of the tracking error signal that is generated when the detection signal is generated at each unit time during the generation of that detection signal, and switch-over means for outputting as an optical system tracking control signal the tracking error signal during normal operation and the output of the cumulative addition means during the outputting of the detection signal.

In one form, the detection means is designed to detect whether or not the high-frequency component of at least one output of a tracking light-receiving means is within a predetermined range. In another form, the detection means is designed to detect whether or not the high-frequency component of the tracking error signal is within a predetermined range. The detection means may alternatively take another configuration, apart from those described above, so long as the means chosen substantially serves to detect any deviation that occurs during tracking.

The detection means may include a high-pass filter which receives the output of the tracking light-receiving means, a window comparator which receives the output of such a high-pass filter, and a gate circuit. Alternatively, the detection means may include just a high-pass filter which receives the tracking error signal, and a window comparator which receives the output of the high-pass filter.

Generally, the skew of an optical memory card relative to an optical system can be considered to be substantially constant with respect to each combination of the writing/reading device with different cards. In particular, the skew can be considered constant as regards the combination of the card's tracking lines and the card writing/reading device.

Accordingly, in the present invention, skew information on an optical memory card is obtained in advance during the writing/reading of the card, and a signal approximating to a normal tracking error signal is schematically generated utilizing the skew information thus obtained for a short period of time during which a normal tracking error signal is lost or is about to be lost due to dust or a scratch existing on the card. In consequence, normal tracking state can be maintained without interrupting the writing or reading of the optical memory card, and the schematic tracking state can be returned to the original normal state after this period has passed. Further, it is to be expected that the presence of the dust or scratch makes normal reading of data on the optical memory card impossible. If the data is damaged for a short period, it can then be restored by means of a known error detecting/correcting technique.

BEST MODE FOR CARRYING OUT THE INVENTION

Embodiments of the present invention will be described below.

Figure 1:
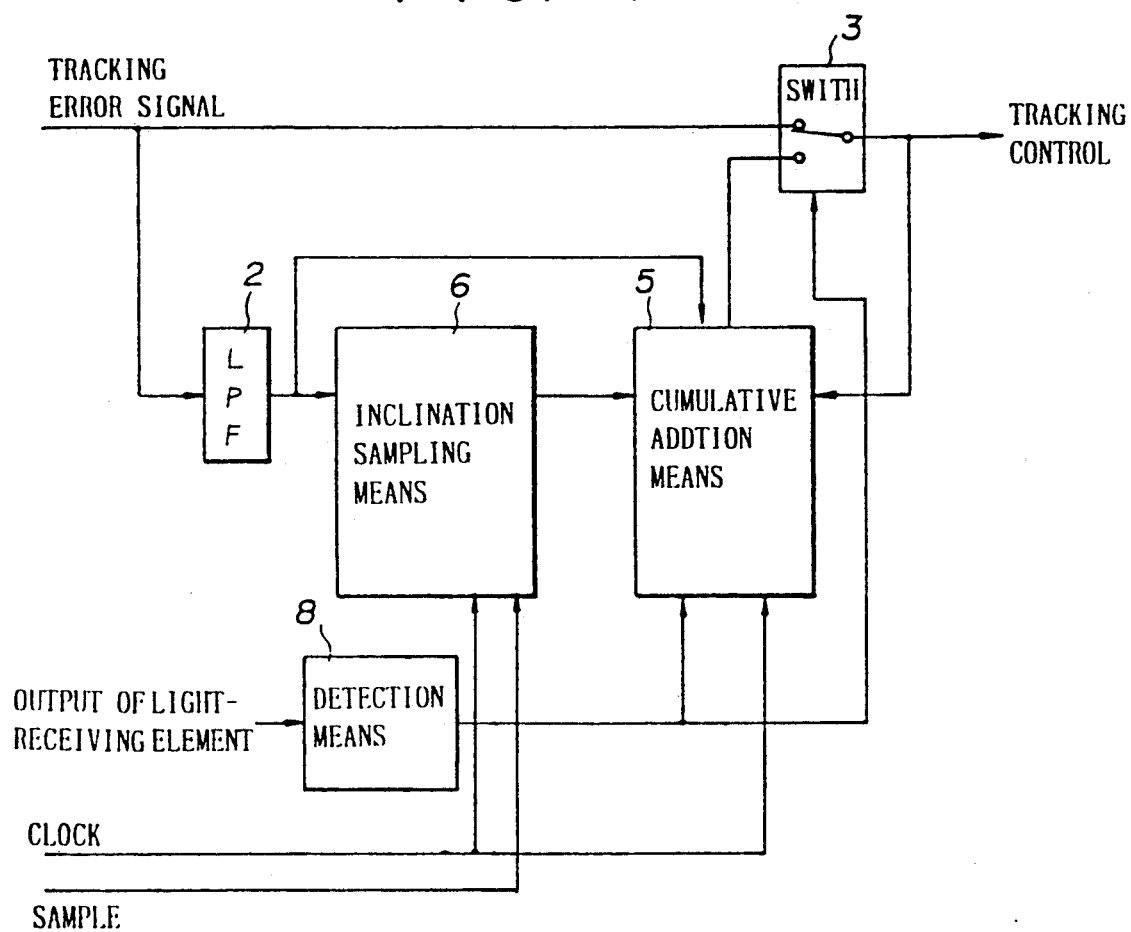
FIG. 1 is a block diagram, illustrating the structure of the present invention.
Figure 2B:
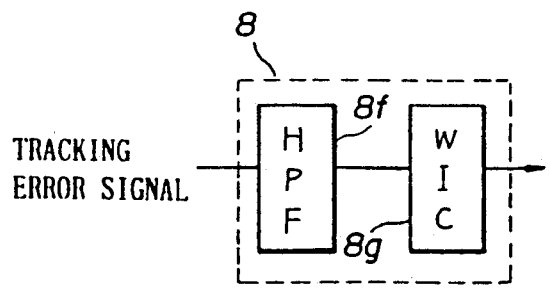
FIG. 2B is a block diagram of another example of detection means in the device of FIG. 2A.
Figure 2A:
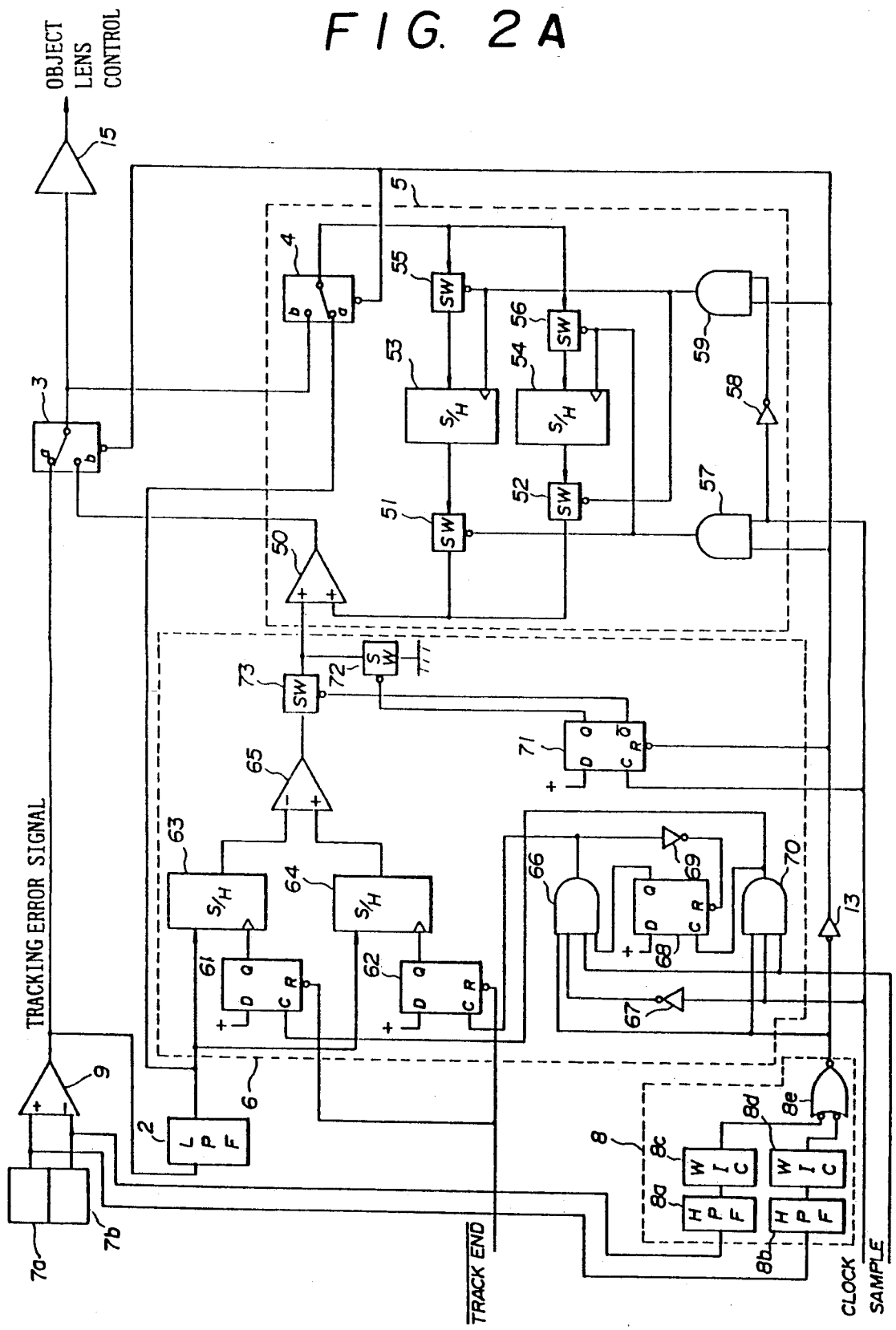
FIG. 2A is a block diagram of a tracking device, showing an embodiment of the present invention.
Figure 4:
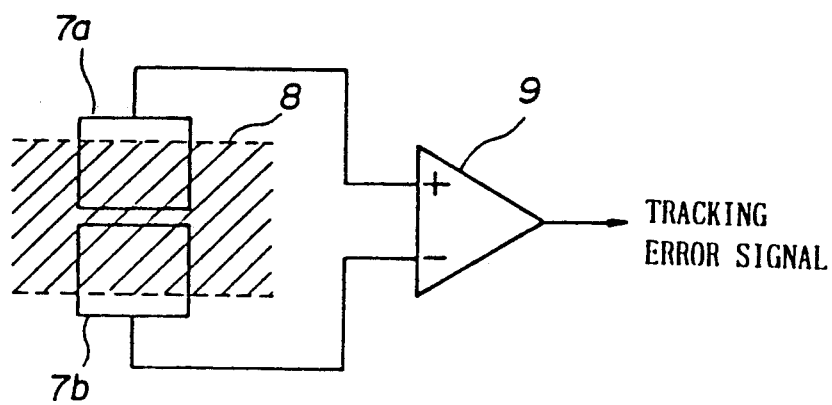
FIG. 4 illustrates how a tracking error signal is generated.

Referring first to FIG. 2A, which is a block diagram of a tracking device for an optical memory card according to the present invention, a first embodiment of the present invention will be described. The tracking error signal employed in this embodiment is obtained by the same configuration as that shown in FIG. 4.

In this embodiment, the tracking device includes a low-pass filter (LPF) 2, inclination information sampling means 6, detection means 8, switch-over means 3, cumulative addition means 5, an inverter 13 and an amplifier 15.

The detection means 8 includes high-pass filters (HPF) 8a and 8b which respectively receive the outputs of tracking light receiving means 7a and 7b, window comparators (WICs) 8c and 8d which respectively receive the outputs of the two filters, and a negative-input, negative-output OR gate 8e (which is equivalent to an AND gate) which receives the outputs of the two WICs. In this embodiment, the WIC is designed to output a logic high signal when the input signal is within a predetermined range. It employs a known circuit configuration.

The inclination information sampling means 6 includes sample holding (S/H) circuits 63 and 64 which receive the output of the LPF 2, D flip-flops (F/Fs) 61 and 62 for controlling the operation of the S/H circuits 63 and 64, AND gates 66 and 70 for respectively clock driving the F/Fs 61 and 62 upon receipt of the output of the detection means 8, an F/F 68, inverters 67 and 69, a subtracter 65 which receives the outputs of the S/H 63 and 64, switches (SWs) 72 and 73 which switch over a signal to be output from the inclination information sampling means 6, and an F/F 71 for controlling the switches 72 and 73 upon receipt of the output of the detection means and a clock.

The F/Fs 61 and 62 receive at their reset input terminals R a track end (TRACKEND) signal which represents the end of a track of the optical memory card.

The switch-over means 3 is constituted by a known analog multiplexer, which selects an a input when it receives the logical low signal. It selects a b input when the control input thereof is at the logical high level.

The cumulative addition means 5 includes an adder 50 which receives at one of its input terminals the output of the inclination information sampling circuit 6, S/H circuits 53 and 54, switches 51, 52, 55 and 56 which switch the inputs/outputs of the S/H circuits 53 and 54, AND gates 57 and 59 for controlling the conduction and nonconduction of the switches 51, 52, 55 and 56 in accordance with the output of the detection means (which is inverted by the inverter 13) and a clock signal, an inverter 58 which inverts the output of the inverter 13, and an analog multiplexer 4 which switches the output of the switch-over means 3 and the output of the LPF 2 in response to the output of the detection means and outputs a selected signal to the switches 55 and 56. The multiplexer 4 may have the same configuration as that of the multiplexer 3.

The switches employed in this tracking device are all designed to conduct when they receive a logical low signal and does not conduct when they receive a logical high signal.

The detection means 8 may have a configuration shown in FIG. 2B. The detection means 8 shown in FIG. 2B includes an HPF 8f which receives the tracking error signal, and a WIC 8g which receives the output of the HPF 8f. The detection means having the configuration shown in FIG. 2A is advantageous in that the variations in the output of each of the light-receiving elements can be obtained.

The operation of the tracking device shown in FIG. 2A will now be described with reference to FIG. 3. In the example shown in FIG. 3, it is assumed that there exists a relatively high degree of skew in the tracking lines.

Figure 5A:
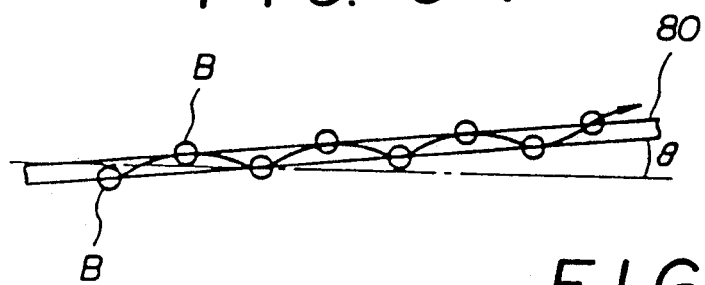
FIG. 5A and 5B respectively illustrate tracking by an optical beam and an example of the tracking error signal.
Figure 5B:
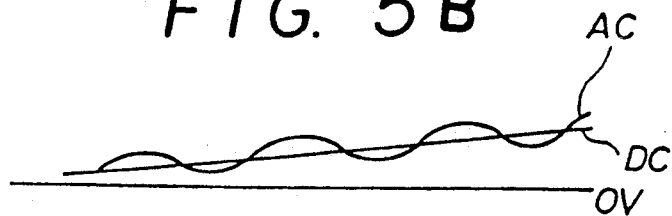
Figure 6:
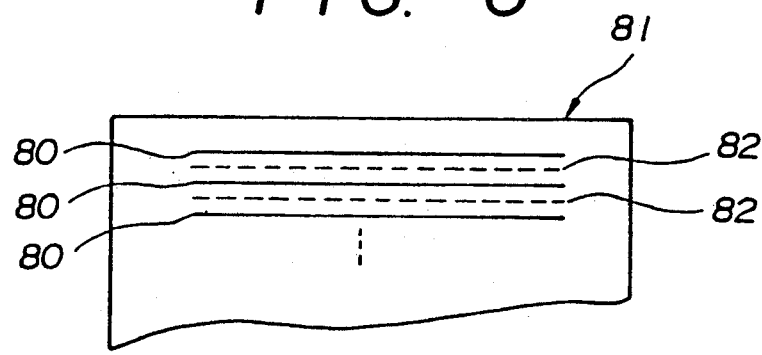
FIG. 6 is a schematic view of an optical memory card.

When the deviation occurring during tracking is within the range in which it can be corrected by moving the objective lens, tracking is performed and an optical beam B thus follows the corresponding tracking line in a zigzag fashion, as shown in FIG. 5A. The tracking error signal used in this tracking is an AC signal containing a low-frequency frequency (dc) component which corresponds to an angle θ of the skew and which slopes with time, as shown in FIG. 5(B).

The detection means 8 receives the outputs of the light-receiving means 7a and 7b, compares the high-frequency components thereof with V1 and V2 (see FIG.

3) that define a standard range, and delivers a logic low signal when the high-frequency components are outside the standard range. The standard range may be a range defined by voltages output immediately before the occurrence of deviation during tracking. Since the high-frequency component of the tracking error signal exceeds the standard range due to dust or a scratch existing on the card, the dust or scratch can be detected by detecting the high-frequency component exceeding this range.

During reading of data from the optical memory card, as the card is run, the LPF 2 delivers a signal which is inclined in proportion to the magnitude of a skew, like the straight portion of a waveform shown at the top in FIG. 3(a). After the running of the card has stabilized, a sampling signal SAMPLE is generated at time t1. It is assumed that up to t1 the output of the detection means 8 is at the logic high level (there is no dust or scratch existing on the card). Since the sampling signal must be generated when the output of the detection means 8 is at the logic high level, a point t1 may be moved in correspondence with the output of the detection means 8. The sampling signal has a pulse duration longer than one period of a clock signal CLOCK. After the sampling signal has risen, the output of the AND gate 70 assumes the logical high level at the leading edge of a subsequent clock, t2, and this causes the F/Fs 61 and 68 to simultaneously trigger and output a logical high signal from their output terminals Q. As a result, the output of the LPF 2 is held in the S/H 63 at the leading edge of the output Q of the F/F 61, and the inverter 67 delivers a logic high signal at the trailing edge of the clock, t3 after the output Q of the F/F 68 has assumed the logic high level, causing the AND gate 66 to output a logic high signal. This logic high signal clock triggers the F/F 62 and causes it to deliver a logic high signal from its output terminal Q to the S/H 64 to make it hold the output of the LPF 2 after a time interval that is equivalent to the half duration of the clock following the holding of the output of the LPF 2 by the S/H 63. The logic high signal output from the AND gate 66 also resets the F/F 68 through the inverter 69. Thus, the output of the LPF 2 is held by the S/Hs 63 and 64 by a time internal equivalent to the half duration of the clock, and a change of the low-frequency component of the tracking error signal per unit time is output from a substracter 65. At this time, the input a is selected in the switch-over means 3, so that the tracking error signal is received by the amplifier 15. The amplifier 15 performs tracking control by moving an objective lens in the transverse direction of the tracks.

It is now assumed that the input of the detection means has exceeded the standard range defined by V1 and V2 at time t4. At this time, the output of the detection means 8 assumes the logic low level, and this logic low signal is inverted by the inverter 13 and is supplied to the F/F 71, the cumulative addition means 5 and the switch-over means 3. As a result, the F/F 71 is set, and the b input of the multiplexer is selected in the switch-over means 3. In other words, the output of the adder 50 is supplied to the amplifier 15 in place of the tracking error signal. The logical high signal of the inverter 13 also opens the gates 57 and 59 in the cumulative addition means 5 and causes the multiplexer 4 to select the b input. In the example given in FIG. 3(a), since the clock is at the logic low level at time t4, the output of the gate 57 assumes the logic low level, whereas the output of the gate 59 assumes the logic low level. This causes the switches 51 and 56 to conduct and the switches 52 and 55 not to conduct. That is, the output of the S/H 53 is sent to the adder 50, and the S/H 54 holds the output of the adder 50. The output of the LPF 2 at t4 is present in the S/H 53 at this moment. However, the multiplexer 4 selects the contacts thereof so that it receives the output of the switch-over means 3 thereafter until the detection signal rises again.

At the leading edge of a first clock generated after t4, t5, the F/F 71 triggers and delivers a logical high pulse from its Q output terminal and a logical low pulse from its inverted Q output terminal, causing the switch 73 to conduct and the switch 72 not to conduct. That is, the switches 72 and 73 are switched over such that the output of the subtracter 65 (the inclination signal) is supplied to one of the input terminals of the adder 50. As a result, the inclination signal is added to the output of the S/H 53 in the adder 50, and the resultant signal is sent to the amplifier 15 through the switch-over means 3.

At the trailing edge of the clock t6, the switches 51, 52, 55 and 56 in the cumulative addition means 5 are all inverted, and the S/H 53 thereby holds the output of the adder 50 through the multiplexers 3 and 4 whereas the output of the S/H 54 is supplied to the adder 50.

Thus, in the cumulative addition means 5, the input and the output by the S/Hs 53 and 54 are inverted for each time interval equivalent to the half duration of the clock, by which the inclination signal is accumulated to the output of the adder 50. As a result, even when no normal tracking error signal cannot be generated due to the existence of dust or scratches on the card, a tracking error signal can be schematically generated in place of an abnormal tracking error signal. Since the schematic generation of this tracking error signal utilizes the skew information on the card, it approximates to an actual tracking error signal, and can be returned to its original normal state at time t7 when no dust or a scratch is detected.

At the end of one track, a track end signal is generated, by which the F/Fs 63 and 64 in the inclination information sampling means are reset and become ready for taking in the inclination information sampled value for a subsequent track. If the subsequently same degree of skew is present for each track in one card, and if the inclination information can remain effective for a relatively long period of time, inclination information may be taken in once for each card.

If the clock is at the logical high level at time t4 when the detection means delivers a logical low signal, the time needed for the first inclination signal to be added to the output of the adder 50 is slightly prolonged, as shown in FIG. 3(b). In that case, it is necessary for the period of the clock to be set such that displacement $\alpha$ of the output of the adder 50 from the normal low-frequency component is below a value with which an optical beam is moved to an adjacent track.

Figure 3:
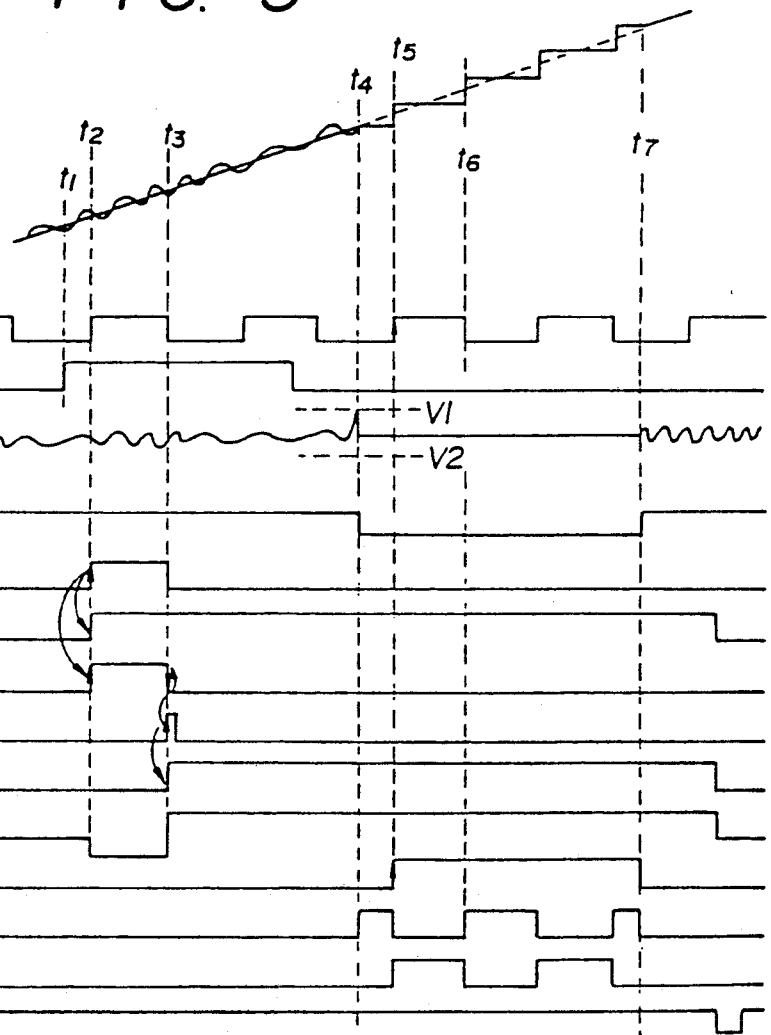
FIG. 3 illustrates the operation timings of the device of FIG. 2A.

In the example shown in FIG. 3, the inclination of the output of the LPF 2 is a positive value. It is readily understood that, when the inclination of the output of the LPF 2 is a negative value, the tracking device operates in the same manner.

What is claimed is:

1. A tracking device for an optical memory card in which tracking control is performed in accordance with a tracking error made by an optical system relative to said optical memory card, comprising:

inclination information sampling means for calculating changes per unit time of a low-frequency component of a tracking error signal;

detection means for outputting a detection signal for the duration of a deviation occurring during tracking that exceeds a predetermined standard range;

cumulative addition means for cumulatively adding the output of said inclination information sampling means to the low-frequency component of said tracking error signal that is generated when said detection signal is generated at each unit time during the generation of said detection signal: and switch-over means for outputting as an optical system tracking control signal said tracking error signal during a normal operation and the output of said cumulative addition means during the outputting of said detection signal.

2. A tracking device for an optical memory card according to claim 1, wherein said detection means is for detecting whether or not a high-frequency component of at least one output of tracking light-receiving means is within a predetermined range.

3. A tracking device for an optical memory card according to claim 2, wherein said detection means includes a high-pass filter which receives the output of said tracking light-receiving means, a window comparator which receives the output of said high-pass filter, and a gate circuit.

4. A tracking device for an optical memory card according to claim 1, wherein said detecting means is for detecting whether or not a high-frequency component of said tracking error signal is within a predetermined range.

5. A tracking device for an optical memory card according to claim 4, wherein said detection means includes a high-pass filter which receives said tracking error signal, and a window comparator which receives the output of said high-pass filter.

* * * * *